Feb. 24, 1959

J. A. HOWARD 2,874,450

DUAL CONTROL INDEXING TURRET

Filed Nov. 22, 1954

INVENTOR.
JOSEPH A. HOWARD
BY C. G. Stratton

ATTORNEY

United States Patent Office 2,874,450
Patented Feb. 24, 1959

2,874,450

DUAL CONTROL INDEXING TURRET

Joseph A. Howard, Visalia, Calif.

Application November 22, 1954, Serial No. 470,302

7 Claims. (Cl. 29—41)

This invention relates to a tool-holding indexing machine of the type disclosed in Pat. No. 2,596,482. The present turret device is an improvement over the structures disclosed in said patent.

In said patent, the tool-holding turret is indexed from one position to the next by two successively-engaging projections on an operating handle that is manually rotated around a center immediately outside of the peripheral edge of the turret. Since the operating handle must safely clear a bar of stock at the turrent center during such rotation, it is evident that the length of said handle is limited and the same is further limited by the fact that safe clearance between the operator's hand and the rotating stock is essential.

Also, in the patent structures, the tools carried by the turret are projected to stock forming position by a cam on the center of rotation of the handle. Economy of manufacture requires that such cam be as small as practicable. Hence, the immediate adjacency of the handle center to the turret periphery.

An object of the present invention is to provide improved means in a tool-carrying indexing turret, enabling retention of the smaller, more economical tool-actuating cam and yet enabling substantial increase in the operative length of the indexing handle with the power advantages attending such increase in handle length.

Also, in said patent, there are practical limits to the number of tools that may be accommodated by the turret —eight having proved satisfactory in practice. Another object of the invention is to increase the flexibility in use of the indexing turret by providing the same with novel means enabling, selectively, different degrees of projection of the tools. Thus, whereas an eight-tool turret according to the patent could perform not more than eight different operations on a piece of stock, the present eight-tool turret can perform up to sixteen different operations simply by projecting each tool two different distances relative to the stock.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes one embodiment of the present invention, which is given by way of illustration or example only.

In the drawing, like reference characters designate similar parts in the several views.

Figure 1:
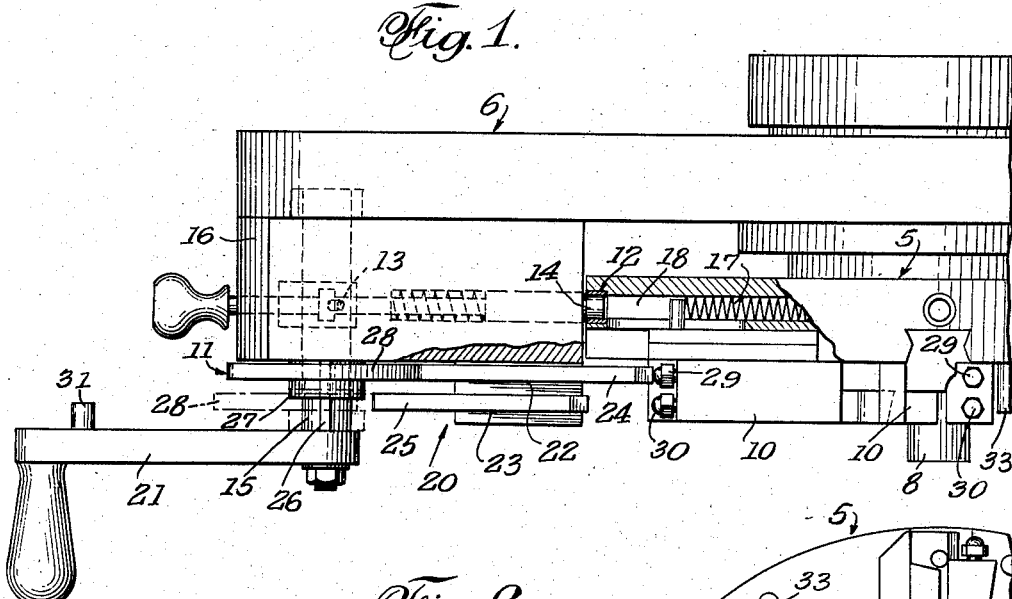
Fig. 1 is a broken top plan view, partly in section, of an indexing turret according to the present invention.

The conventional elements of the present device comprise a turret 5 mounted on a bracket 6 and rotational around an axis 7 along which a length of stock 8 is adapted to be fed, means 9 carried by the turret to support said stock while the same is being successively operated on by the different tools 10 mounted on said turret, cam means 11 to project said tools to stock-machining position, and retractible turret-locking means to hold the turret stationary during tool operation. Said cam means 11 and means 13 to effect retraction of a locking bolt 14 comprise parts of the locking means 12 and are mounted on a shaft 15 that has bearing in a block or housing 16 affixed to bracket 6. Expansion springs 17 disposed in radial grooves 18 in turret 5 normally retract the tools 10 in an outward direction, the cam means 11 effecting inward projection of said tool against the force of said springs as the same are placed, by indexing movement of the turret, into alignment with cam means 11.

The above-described machine is provided with means 20 interposed between the turret 5 and the cam means 11 to so space said turret and cam means that the operating handle 21 on shaft 15 is made commensurately longer and the increased length utilized to afford a power advantage that eases the indexing of the turret.

Said means 20 is shown as guides 22 and 23 formed or provided in block or housing 16 and pusher slides 24 and 25 respectively disposed in said guides. In the present instance, the cam means 11 is slidably mounted on shaft 15, a key 26 being provided causing rotation of said cam means together with the shaft. As shown, said means comprises a hub 27 on which is provided a cam lobe 28, the same being shiftable to bring the lobe into selective alignment with slides 24 and 25 between the block 16 at the rear and handle 21 at the front.

Each tool 10, on its outward end, is provided with adjustable studs 29 and 30 in respective alignment with slides 24 and 25.

From the foregoing it will be clear that the increased length of handle 21 enables placing turret-indexing pin or lug 31 such a distance from shaft 15 as to provide a long lever for effecting indexing movement of the turret. Said pin 31 encounters the face 32 of the tool that is aligned with indexing mechanism and causes counter-clockwise rotation of the turret while the bolt 14 is retracted.

It will also be clear that by making slides 24 and 25 of different lengths, the same cam lobe 28 will project said aligned tool slide two different distances. Hence, the tool of said tool slide can be used to cut into stock 8 to two different depths. Simple shift of the cam means 11 to bring the lobe 28 into operating alignment with one or the other pusher slide, will provide each tool slide of the turret with two operative projecting movements.

This flexibility of use can be had also by making the slides 24 and 25 the same length and adjusting studs 29 and 30 to different heights, as desired. Also, if the feature of increased lever power is omitted by omission of said slides and return of the center of shaft 15 to close adjacency to the turret, the transversely shiftable cam can be directly operatively engaged with the differently adjusted studs 29 and 30.

Figure 2:
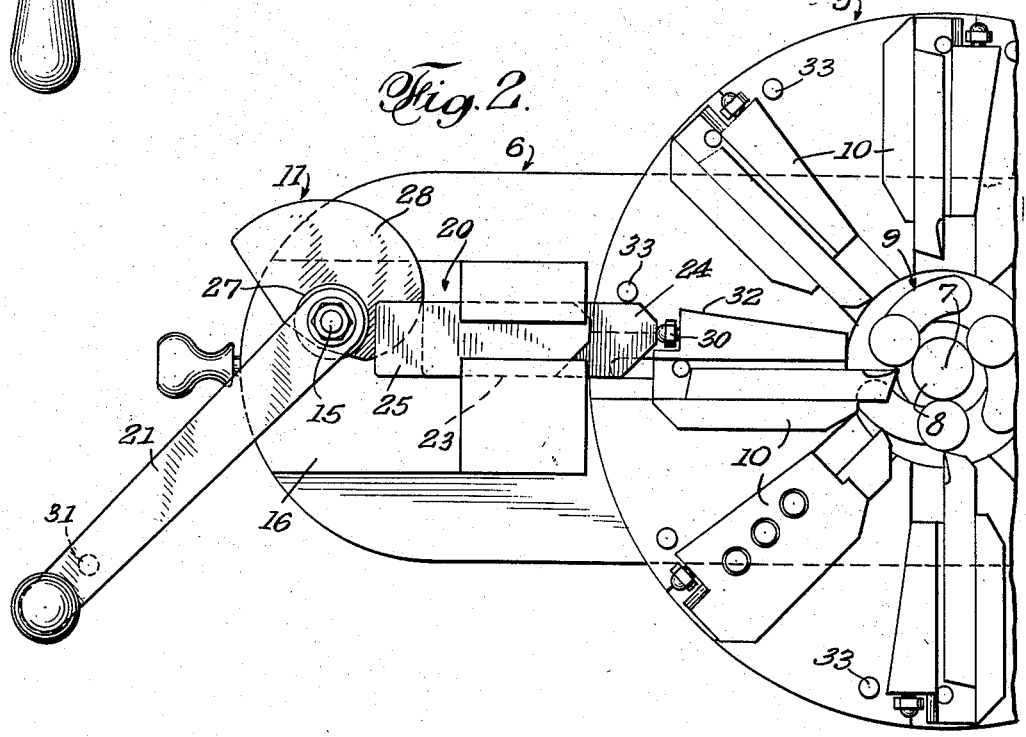
Fig. 2 is a front elevational view thereof.

In the event of accidental seizure of a tool in the stock 8, spring 17 may not be strong enough to return the tool slide 10 to its outward position. Hence, the slide 24 or 25, which had been projected to project the tool slide, will remain projected. This projection may be used to prevent further indexing of the turret by providing the latter with an abutment projection 33 in such position as to have interfering relation with the projected slide, as best seen in Fig. 2. Thus, only when the slides 24 and 25 are retracted, such retraction being effected by the springs 17 of the tool slides, can the turret be indexed.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what is claimed and desired to be secured by Letters Patent is:

1. A dual control indexing turret comprising the combination of a rotatably mounted turret having its axis of rotation coincident with the axis of stock extending through said turret, an operating handle rotatably mounted adjacent the periphery of said turret, said handle having a shaft running parallel to the axis of said turret, a cam mounted on said shaft and rotatable in a plane parallel to the plane of rotation of said turret, and a tool-engaging slide mounted in responsive relation to said cam, said slide being movable between tool-engaging and dis-engaging positions and projected by said cam to tool-engaging position during rotation of said operating handle.

2. A dual control indexing turret comprising the combination of a rotatably mounted turret having its axis of rotation coincident with the axis of stock extending through said turret, an operating handle rotatably mounted adjacent the periphery of said turret, said handle having a shaft running parallel to the axis of said turret, a cam mounted on said shaft and rotatable in a plane parallel to the plane of rotation of said turret, a block mounted adjacent to the periphery of said turret, the shaft of said handle being axially slidable on said block, and at least one slide mounted in said block movable between tool-engaging and disengaging position, said slide being projected by said cam to tool-engaging position during rotation of said operating handle.

3. In a mechanism of the character described, a tool-carrying turret indexable from station to station, a cam device disposed beyond the periphery of the turret, tool-engaging slide means interposed between the cam means and the turret and projectable by the cam means in a direction toward the turret center to advance a tool on the turret, and a projection carried by the turret and so engaged with the slide means, when projected by the cam means, as to lock the turret against indexing movement to, thereby, hold the turret non-indexable during the advanced position of said tool.

4. In a mechanism according to claim 3, the slide means comprising two side-by-side slides, means mounting the cam means for selective operative engagement with the slides, and the mentioned projection being extended to engage with the slide that is projected to lock the turret.

5. A dual control indexing turret mechanism comprising the combination of a rotatably mounted turret having its axis of rotation coincident with the axis of stock extending through said turret, an operating handle rotatably mounted beyond the periphery of said turret, said handle having a shaft that is parallel to the axis of said turret, a cam mounted on said shaft and rotatable in a plane parallel to the plane of rotation of said turret, a block mounted adjacent to the periphery of said turret, a tool-engaging slide mounted in said block, said slide being projected by said cam to tool-engaging position during rotation of said operating handle, and a plurality of projections radially arranged on said turret adjacent the periphery thereof, said projections being arranged to engage said slide when the same is projected to prevent rotation of said turret.

6. A dual control indexing turret mechanism according to claim 5 in which a second slide is provided alongside the mentioned slide and both slides are in endwise tool-engaging relationship, and means is provided to move the cam into selective operative engagement with said slides to project the latter, the mentioned plurality of projections extending from the turret into rotation-preventing engagement with that slide that is projected.

7. A turret mechanism comprising in combination with tool stud means, a block, a tool-engaging slide therein movable between tool-engaging and disengaging positions, a second slide of shorter length slidable in said block for tool actuation with a reduced depth of cut, said tool stud means being in the path of both of said slides, a cam with a rotatable handle, mounted axially movable between positions for engagement of one slide or the other, one or the other of said slides being selectively projected by rotation of said cam according to the selected axial position thereof to move the selected slide to tool-engaging position against said tool stud means.

References Cited in the file of this patent

UNITED STATES PATENTS

| | | |
|---|---|---|
| 2,565,020 | Christman | Aug. 21, 1951 |
| 2,596,482 | Howard | May 13, 1952 |